No. 865,131. PATENTED SEPT. 3, 1907.
P. STEIN.
BODY HEATER.
APPLICATION FILED JAN. 7, 1907.
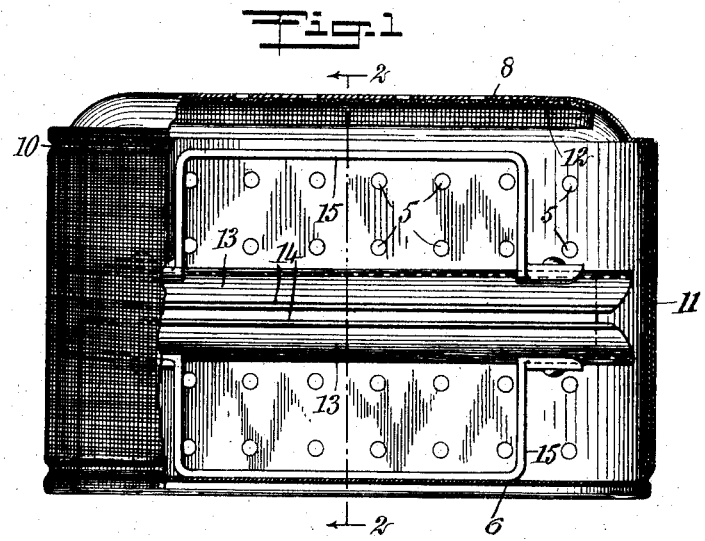
WITNESSES
INVENTOR
Philip Stein
BY
ATTORNEYS

UNITED STATES PATENT OFFICE.

PHILIP STEIN, OF SAN JOSE, CALIFORNIA.

BODY-HEATER.

No. 865,131.     Specification of Letters Patent.     Patented Sept. 3, 1907.

Application filed January 7, 1907. Serial No. 351,129.

*To all whom it may concern:*

Be it known that I, PHILIP STEIN, a citizen of the United States, and a resident of San Jose, in the county of Santa Clara and State of California, have invented a new and Improved Body-Heater, of which the following is a full, clear, and exact description.

This invention relates to certain improvements in heaters, and more particularly to that type of heaters in which a very slowly combustible substance, preferably punk prepared for the purpose, is inclosed within a casing, and after being ignited is carried in the pocket for warming the hands or applied to any particular part of the body to alleviate pain. These heaters are found very useful in cases of neuralgia, rheumatism and the like, and have very material advantages over hot water bottles or similar devices commonly used. The combustible material within the case continues to burn for a great length of time, maintaining its heat until the material is entirely exhausted, whereas a hot water bottle or other similar device soon becomes cold and of no further use until re-heated.

It is old to inclose a combustible substance within a perforated casing and employ the same as a heater, but unless some special means be provided within the casing for holding the combustible substance it rests directly upon the lower side of the casing and often this side becomes heated to an uncomfortably high temperature so that it has to be removed from the body.

The object of my invention is to provide means for supporting the combustible material at a point substantially equi-distant from all sides of the casing, and in such a position that all sides of the casing will be heated to substantially the same temperature. Furthermore, my improved holder for the combustible material supports said material out of contact with the wall, so as to prevent any of the ignited material or sparks from passing through the perforations in the walls of the casing, and the igniting of that portion of the clothing in contact with the heater.

The invention consists in certain features of construction and combination of parts, all of which will be fully set forth hereinafter and particularly pointed out in the claims.

Reference is to be had to the accompanying drawings forming a part of this specification, in which similar characters of reference indicate corresponding parts in all the figures, in which Figure 1 is a side elevation of a device embodying my invention, a portion of said device being broken away; Fig. 2 is a transverse section on the line 2—2 of Fig. 1; Fig. 3 is a perspective view of the improved holder for the combustible material; and Fig. 4 is an end view of a modified form of holder.

In the specific embodiment of my invention which I have illustrated in the accompanying drawings, there is provided a casing of any desired form, having the walls thereof provided with a plurality of perforations 5, and connected together at one side by an imperforate wall 6. This wall is preferably seamed to the side walls 7 of the casing, in order to form a permanent closure, while the opposite side of the casing is closed by a removable cover 8 held in place by flanges 9 and shoulders 10 on the walls of the casing. The cover may be removed by sliding the same endwise, and said cover is also provided with perforations similar to those in the side walls. The entire casing, save for the removable cover, is inclosed within a cloth covering 11, which serves to give the device a more finished appearance and make it more pleasing to the touch when applied to the body. The inner surface of the cover 8 may, if desired, be provided with a cloth lining 12 serving to close the perforations in the cover as does the covering 11 for the body. The cloth forming this covering is thin enough to allow air to freely pass through the same to maintain the combustion of the material being burned.

Within the casing I provide a holder for the combustible material, and this holder is preferably composed of two parts, each having a semi-cylindrical receiving portion 13 terminating in flanges 14, and brackets 15 extending outward from the opposite sides thereof. The receiving portions 13 are preferably provided with a longitudinal row of perforations, whereby the air may more readily gain access to the material. The material to be burned may be of any desired character, but is preferably in the form of cylindrical cartridges of slowly burning carbonaceous matter, as, for instance, punk. As shown, this material 16 is inclosed within a paper wrapper 17, whereby it is held in the desired form and prevented from disintegrating before being used. One of the brackets 15 is normally in engagement with the bottom wall 6 of the casing, while the opposite bracket 15 is closely adjacent the cover 8. These brackets together with the outwardly-directed flanges 14, hold the cartridge in a substantially central position and prevent it from coming in engagement with any of the walls of the casing. When held within the improved supporting means shown, all sides of the casing are heated to substantially the same temperature and the material cannot become broken up by shaking of the case. If no holder is employed for the material, it will readily become disintegrated if the casing is moved, and thus a much greater surface is exposed and the combustion takes place at a greatly increased rate; whereas, in my improved device the cartridge is held in its original position until the material is entirely burned away, and an accidental dropping of the device does not serve to greatly increase the rate of combustion.

In combination with the two parts forming the holder shown in Figs. 1 to 3, inclusive, I may, if desired, employ an additional member 18, whereby a plurality of separate pieces or packages of combustible material may be supported within one device. For supporting a plurality of pieces or packages, members 13 are employed similar to the members above described but spaced apart by the member 18, which latter is provided with two oppositely disposed cylindrical portions facing semi-cylindrical portions of the members 13. Pieces of the combustible material may thus be held between the member 18 and each of the two members 13, while if it is desired to support more than two pieces, an additional intermediate portion 18 may be employed.

Having thus described my invention, I claim as new and desire to secure by Letters Patent:

1. In a device of the class described, a perforated casing, and a holder within said casing, said holder having a receiving portion, brackets adapted to engage with the top and bottom of the casing and flanges adapted to engage with the side walls of the casing to hold the receiving portion in a substantially central position in respect to the casing.

2. A device of the class described, comprising a perforated casing, and a holder for combustible material, said holder comprising a plurality of members each having a semi-cylindrical portion and an intermediate member having oppositely disposed semi-cylindrical portions.

3. A holder for a combustible material, comprising a plurality of members, each member having a receiving portion and outwardly extending portions for supporting the same, and an intermediate member having oppositely disposed receiving portions which coact with the receiving portions of the first mentioned members to form a plurality of pockets.

4. A device of the class described, comprising a perforated casing, a holder within said casing, said holder comprising two similar separable parts, each part comprising a semi-cylindrical receiving portion provided with perforations, a bracket adapted to engage with one wall of the casing, and flanges adapted to engage with other walls of the casing.

5. In a device of the class described, a casing and a removable holder within said casing, said holder comprising two similar separable parts, each part having a semi-cylindrical sheet metal perforated receiving portion, a bracket for engagement with one wall of the casing, and flanges integral with the receiving portion for engagement with opposite sides of the casing.

In testimony whereof I have signed my name to this specification in the presence of two subscribing witnesses.

PHILIP STEIN.

Witnesses:
  W. E. HAZELTINE,
  MARY S. HAZELTINE.